(12) United States Patent
Shachar et al.

(10) Patent No.: US 12,511,411 B2
(45) Date of Patent: Dec. 30, 2025

(54) DIVIDING DATA BETWEEN STORAGE EQUIPMENT IN DIFFERENT SECURITY ZONES

(71) Applicant: Dell Products L.P., Round Rock, TX (US)

(72) Inventors: Tomer Shachar, Omer (IL); Arieh Don, Newton, MA (US); Yevgeni Gehtman, Modi'in (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 770 days.

(21) Appl. No.: 17/867,669

(22) Filed: Jul. 18, 2022

(65) Prior Publication Data

US 2024/0020397 A1   Jan. 18, 2024

(51) Int. Cl.
   *G06F 21/62* (2013.01)
(52) U.S. Cl.
   CPC .......... *G06F 21/62* (2013.01); *G06F 21/6236* (2013.01)
(58) Field of Classification Search
   CPC .. G06F 21/62; G06F 21/6236; G06F 21/6218; H04W 12/086
   See application file for complete search history.

(56) References Cited

U.S. PATENT DOCUMENTS

| | | | |
|---|---|---|---|
| 9,323,581 B1 * | 4/2016 | van Rotterdam | G06F 3/0644 |
| 10,469,457 B1 * | 11/2019 | Sokolov | H04L 63/061 |
| 10,896,200 B1 * | 1/2021 | Krishnan | H04L 67/1034 |
| 11,611,441 B2 * | 3/2023 | Beecham | G06F 16/27 |
| 11,809,610 B2 * | 11/2023 | Mundra | G06F 21/79 |
| 2010/0153740 A1 * | 6/2010 | Dodgson | G06F 11/2061 713/189 |
| 2010/0161919 A1 * | 6/2010 | Dodgson | H04L 67/1097 713/189 |
| 2014/0281545 A1 * | 9/2014 | Erofeev | G06F 11/1402 713/171 |
| 2016/0078245 A1 * | 3/2016 | Amarendran | G06N 20/00 713/193 |
| 2017/0316075 A1 * | 11/2017 | Deshmukh | H04L 67/1095 |
| 2019/0080099 A1 * | 3/2019 | Roth | G06F 21/602 |
| 2020/0074091 A1 * | 3/2020 | Jain | H04L 9/0894 |
| 2021/0173945 A1 * | 6/2021 | Karr | G06F 3/065 |
| 2021/0248110 A1 * | 8/2021 | Maurer | G06F 16/9024 |
| 2022/0171535 A1 * | 6/2022 | Kumar | G06F 3/0683 |
| 2023/0409245 A1 * | 12/2023 | Park | G06F 3/0607 |

* cited by examiner

*Primary Examiner* — Khalid M Almaghayreh
(74) *Attorney, Agent, or Firm* — Amin, Turocy & Watson, LLP

(57) ABSTRACT

The technologies described herein are generally directed toward maintaining data coherence after an updating node fails during an update. According to an embodiment, a system can comprise a processor and a memory that can enable performance of operations including respectively mapping a logical storage resource to first and second storage resources in first and second security zones associated with first provider and second providers. The operations can further include receiving a request to store a data resource at the logical storage resource. Further, the operations can include, based on a distribution policy associated with the data resource, dividing, by the storage controller equipment, the data resource into a first storage segment stored on the first storage resource and a second storage segment stored on the second storage resource.

20 Claims, 10 Drawing Sheets

DIVIDING DATA BETWEEN STORAGE EQUIPMENT IN DIFFERENT SECURITY ZONES

BACKGROUND

Modern data storage systems can facilitate the storage and manipulation of many types of data by large numbers of client nodes. Different approaches can be used to improve the security, performance, and scalability of data storage, retrieval, and manipulation operations. In some circumstances different approaches can conflict. For example, to improve scalability of data access capabilities, systems can utilize offsite cloud-resources which can have characteristics that differ from local storage solutions, e.g., security, latency, and redundancy.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can include a processor and a memory that stores executable instructions that, when executed by the processor, facilitate performance of operations. The instructions can include an instruction to map a logical storage resource to a first storage resource in a first security zone associated with a first provider entity and a second storage resource in a second security zone associated with a second provider entity. Further, the instructions can include an instruction to receive a request to store a data resource at the logical storage resource. The instructions can further include an instruction to, based on a distribution policy associated with the data resource, divide, by the storage controller equipment, the data resource into a first storage segment stored on the first storage resource and a second storage segment stored on the second storage segment stored on the second storage resource.

An example method can comprise map a logical storage resource to a first storage resource in a first security zone associated with a first provider entity and a second storage resource in a second security zone associated with a second provider entity. Further, the method can include receive a request to store a data resource at the logical storage resource. The method can further include, based on a distribution policy associated with the data resource, divide, by the storage controller equipment, the data resource into a first storage segment stored on the first storage resource and a second storage segment stored on the second storage segment stored on the second storage resource.

An example non-transitory computer-readable medium can comprise instructions that, in response to execution, cause a system comprising a processor to perform operations. These operations can comprise map a logical storage resource to a first storage resource in a first security zone associated with a first provider entity and a second storage resource in a second security zone associated with a second provider entity. Further, the operations can include an operation to receive a request to store a data resource at the logical storage resource. The operations can further include an operation to, based on a distribution policy associated with the data resource, divide, by the storage controller equipment, the data resource into a first storage segment stored on the first storage resource and a second storage segment stored on the second storage segment stored on the second storage resource.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Generally speaking, one or more embodiments described herein can facilitate, based on a distribution policy, dividing data between storage equipment in different security zones. One or more embodiments can use different approaches to, based on a distribution policy, dividing data between storage equipment in different security zones.

As is understood by one having skill in the relevant art(s), given the description herein, the implementation(s) described herein are non-limiting examples, and variations to the technology can be implemented. For instance, even though many examples described herein discuss only two different storage devices, the technologies described herein can be used in many applicable circumstances, e.g., multiple types of storage devices can be used. As such, any of the embodiments, aspects, concepts, structures, functionalities, implementations and/or examples described herein are non-limiting, and the technologies described and suggested herein can be used in various ways that provide benefits and advantages to data manipulation system technology in general, both for existing technologies and technologies in this and similar areas that are yet to be developed.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
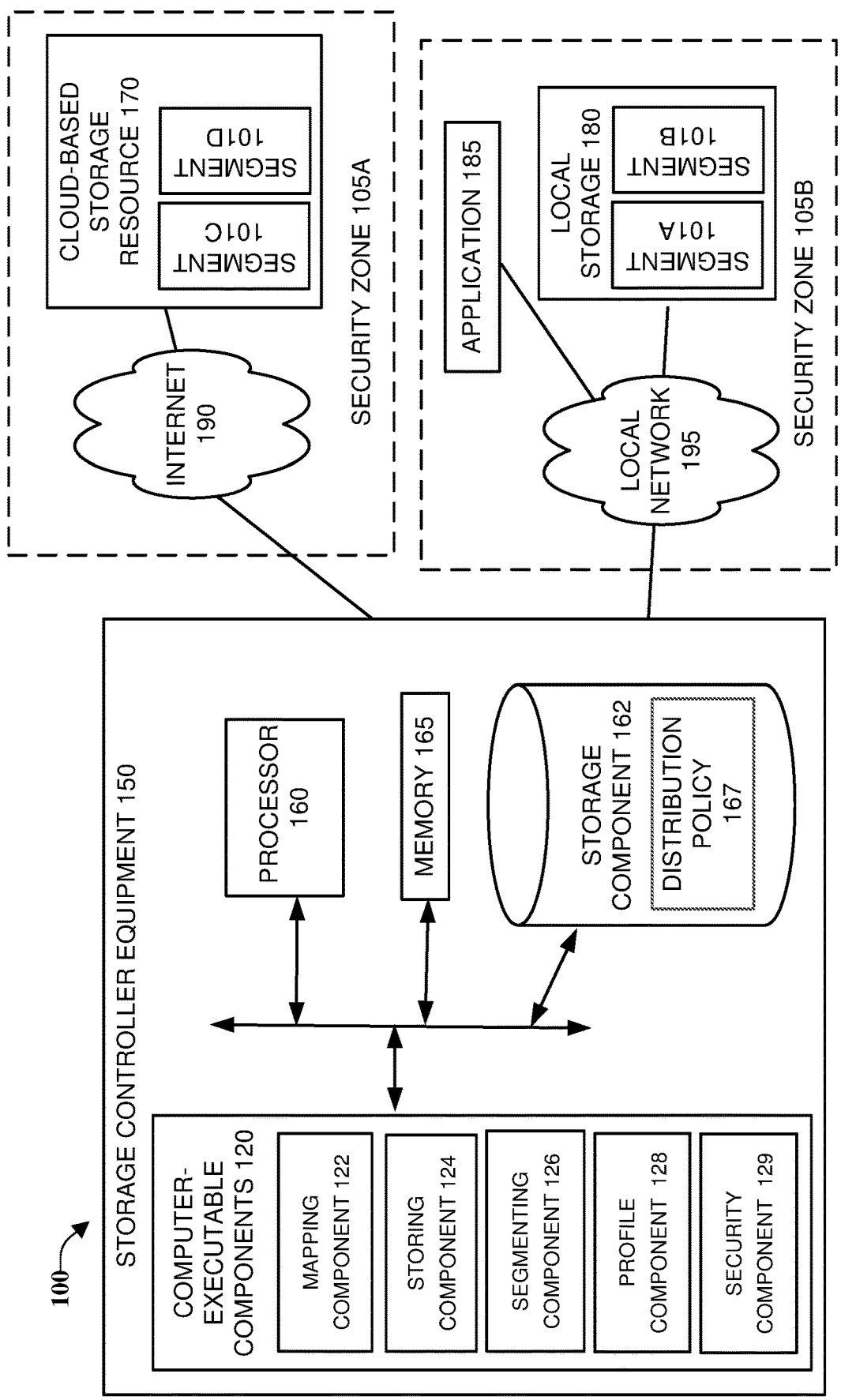
FIG. 1 is an architecture diagram of an example system that can facilitate, based on a distribution policy, dividing data between storage equipment in different security zones.

FIG. 1 is an architecture diagram of an example system 100 that can facilitate, based on a distribution policy, dividing data between storage equipment in different security zones. For purposes of brevity, description of like elements and/or processes employed in other embodiments is omitted. As depicted, system 100 includes storage controller equipment 150 connected to cloud-based storage resource 170 in security zone 105A and local storage 180 in security zone 105B, by internet 190 and local network 195, respectively. Local storage 180 includes segments 101A-B and cloud-based storage resource 170 includes segments 101C-D. Storage controller equipment 150 includes memory 165, processor 160, storage component 162 with stored distribution policies 167. Application 185, also communicatively coupled to local network 195, can be representative of an application with data storage and retrieval requirements.

It should be noted that, as used herein, security zones 105A-B are terms that are broadly used as examples of zones where different levels of security can be required, e.g., data stored inside of an enterprise firewall as compared to data stored at equipment of a cloud-based service provider, e.g., e.g., local storage 180 and cloud-based storage resource 170, respectively. As discussed further below, one or more embodiments can provide a virtually unified storage resource that can flexibly link storage resources from multiple different types of security zones 105A-B.

According to multiple embodiments, storage controller equipment 150 can include memory 165 that can store one or more computer and/or machine readable, writable, and/or executable components 120 and/or instructions. In embodiments, storage controller equipment 150 can further include processor 160. In one or more embodiments, computer-executable components 120, when executed by processor 160, can facilitate performance of operations defined by the executable component(s) and/or instruction(s). Computer executable components 120 can include mapping component 122, storing component 124, segmenting component 126, profile component 128, security component 129, and other components described or suggested by different embodiments described herein, that can improve the operation of system 100 or other systems described herein.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

As discussed further with FIG. 10 below, local network 195 and internet 190 can employ various wired and wireless networking technologies, with the former generally being associated with a private security zone 105 and the latter potentially having many parts of the network being exposed to the public. For example, embodiments described herein can be exploited in substantially any wireless communication technology, comprising, but not limited to, wireless fidelity (WI-FI®) protocol, global system for mobile communications (GSM), universal mobile telecommunications system (UMTS), worldwide interoperability for microwave access (WIMAX®) protocol, enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3x (5G Option 3x), high speed packet access (HSPA), Z-WAVE® protocol, ZIGBEE® protocol, and other 802.XX wireless technologies and/or legacy telecommunication technologies.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure. In some embodiments, memory 165 can comprise non-volatile random-access memory (NVRAM), with different uses including journaled manipulation of storage component 162 data and the enabling of concurrent updating of some types of stored data, in accordance with one or more embodiments.

It is understood that the computer processing systems, computer-implemented methods, apparatus, and computer program products described herein employ computer hardware and/or software to solve problems that are highly technical in nature (e.g., coordinated divisions of data among different types of storage), that are not abstract and cannot be performed as a set of mental acts by a human. For example, a human, or even a plurality of humans, cannot efficiently store and retrieve segmented data with different security, latency and redundancy aspects used for different segments.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of mapping component 122, which can in some implementations map a logical storage resource to a first storage resource in a first security zone associated with a first provider entity and a second storage resource in a second security zone associated with a second provider entity. For example, one or more embodiments can map a reference to a logical storage resource to local storage 180 in security zone 105B associated the enterprise and a cloud-based storage resource 170 in a security zone 105A associated with a cloud-based storage services provider and accessed by internet 190.

In another example, memory 165 can store executable instructions that can facilitate generation of storing component 124, which can in some implementations receive a request to store a data resource at the logical storage resource. For example, one or more embodiments, storing component 124 can receive a request from application 185 to store data at the logical storage resource.

In another example, memory 165 can store executable instructions that can facilitate generation of segmenting component 126, which in some implementations can, based on a distribution policy associated with the data resource, divide, by the storage controller equipment, the data resource into a first storage segment stored on the first storage resource and a second storage segment stored on the second storage segment stored on the second storage resource. For example, one or more embodiments can, based on distribution policy 167 associated with data of application 185, divide, by storage controller equipment 150, the data resource into storage segment 101A stored on local storage 180 and storage segment 101C stored on the cloud-based storage resource 170.

It is appreciated that the embodiments of the subject disclosure depicted in various figures disclosed herein are for illustration only, and as such, the architecture of such embodiments are not limited to the systems, devices, and/or components depicted therein. For example, in some embodiments, storage controller equipment 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

It should be noted that storage controller equipment 150, and other equipment discussed herein, can execute code instructions that may operate on servers or systems, remote data centers, or 'on-box' in individual client information handling systems, according to various embodiments herein. In some embodiments, it is understood any or all implementations of one or more embodiments described herein can operate on a plurality of computers, collectively referred to as storage controller equipment 150. For example, one or more of storage controller equipment 150, and other equipment discussed herein can all be separate subsystems running in the kernel of a computing device as well as operating on separate network equipment, e.g., as depicted in FIGS. 1 and 2.

As described in some examples below, an example system that can benefit in some circumstances from the use of one or more embodiments, is a system that can facilitate storing and retrieving resources among networked computing devices, e.g., file storage systems and databases. In some implementations, system 100 can be a file storage system that implements data protection systems. In different implementations, data protection systems can benefit from the increased flexibility, redundancy, and security, and decreased latency that can be provided by one or more embodiments.

Example data protection systems which can employ one or more of the approaches described with embodiments herein include, but are not limited to EMC ISILON®, an example network attached storage (NAS) platform provided by DELL EMC, Inc. Example storage array devices which can employ one or more of the approaches described with embodiments herein include, but are not limited to, POWERMAX® enterprise data storage array system provided by DELL EMC, Inc.

Figure 2:
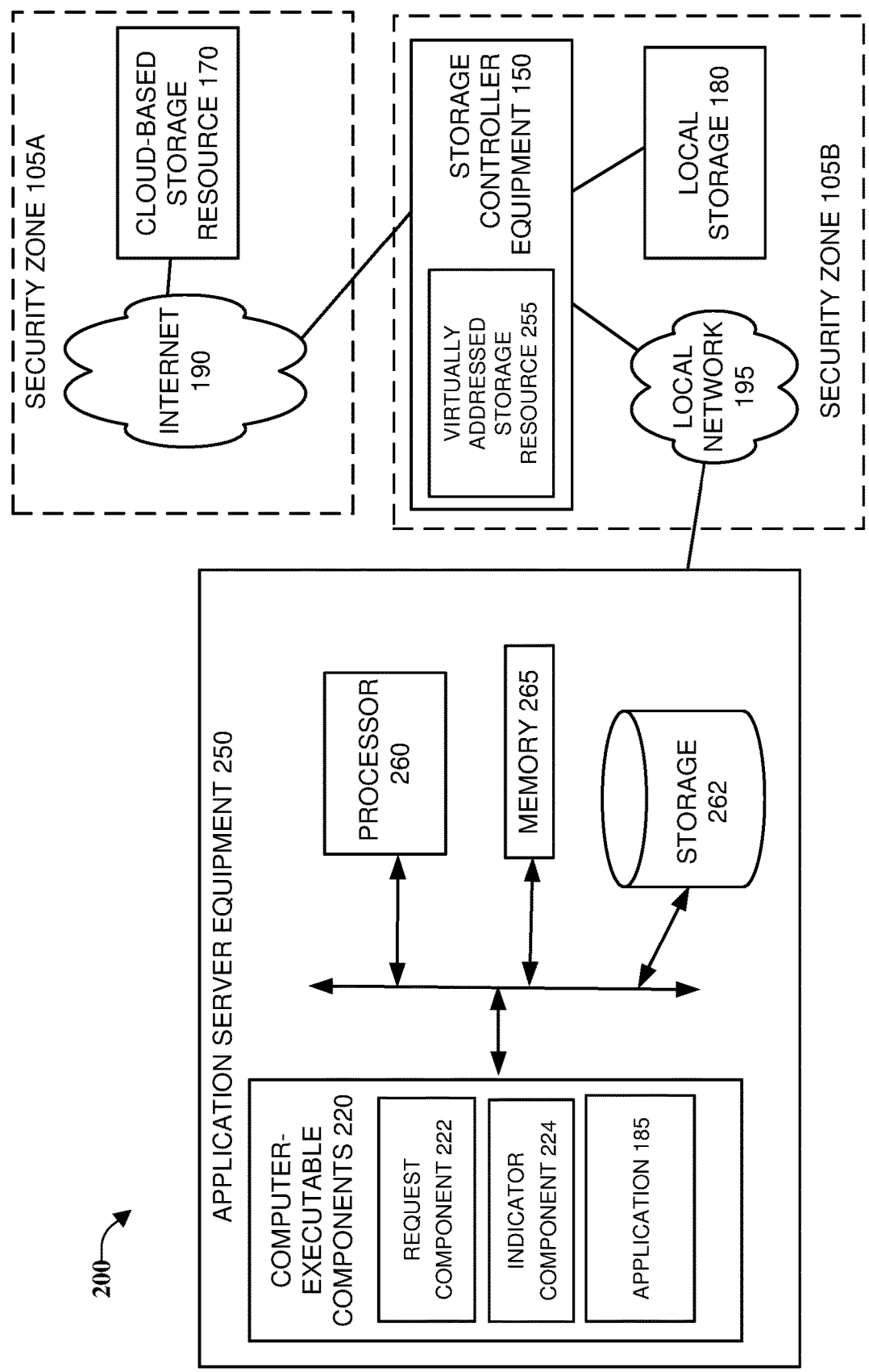
FIG. 2 is an architecture diagram of an example system that can facilitate, based on a distribution policy, dividing data between storage equipment in different security zones, in accordance with one or more embodiments.

FIG. 2 is an architecture diagram of an example system 200 that can facilitate, based on a distribution policy, dividing data between storage equipment in different security zones, in accordance with one or more embodiments. For purposes of brevity, description of like elements and/or processes employed in other embodiments is omitted. As depicted, system 200 includes application server equipment 250 linked to storage controller equipment 150 via local network 195. In contrast to FIG. 1, local storage 180 is directly coupled to storage controller equipment 150 with both being in security zone 105B, instead of via local network 195. Storage controller equipment 150 provides virtually addressed storage resource 255 to link, via internet 190, cloud-based storage resource 170 in security zone 105A to local storage 180.

According to multiple embodiments, application server equipment 250 can include memory 265 that can store one or more computer and/or machine readable, writable, and/or executable components 220 and/or instructions. In embodiments, application server equipment 250 can further include processor 260. In embodiments, processor 260 is similar to processor 160 and storage device 262 is similar to storage component 162, discussed above. According to multiple embodiments, memory 265 can store one or more computer and/or machine readable, writable, and/or executable components 220 and/or instructions.

In one or more embodiments, computer-executable components 220, when executed by processor 260, can facilitate performance of operations defined by the executable component(s) and/or instruction(s). Computer executable components 220 can include request component 222, indicator component 224, application 185, and other components described or suggested by different embodiments described herein, that can improve the operation of system 200 or other systems described herein.

In an example implementation of application server equipment 250, memory 265 can store executable instructions that can facilitate generation of request component 222, which in some implementations, can communicate a retrieval request to a storage controller device to retrieve data from a virtually addressed storage resource. For example, as depicted, a retrieval request from application 185 can be communicated to retrieve data from virtually addressed storage resource 255. As discussed further below, request component 222 can also communicate a write request to facilitate storing data for application 185.

Continuing this example implementation example, memory 265 can store executable instructions that can facilitate generation of indicator component 224, which in some implementations can receive, from the storage controller device, an indication that the data was retrieved from virtually addressed storage resource 255, e.g., data retrieved based on the request from application 185.

Figure 3:
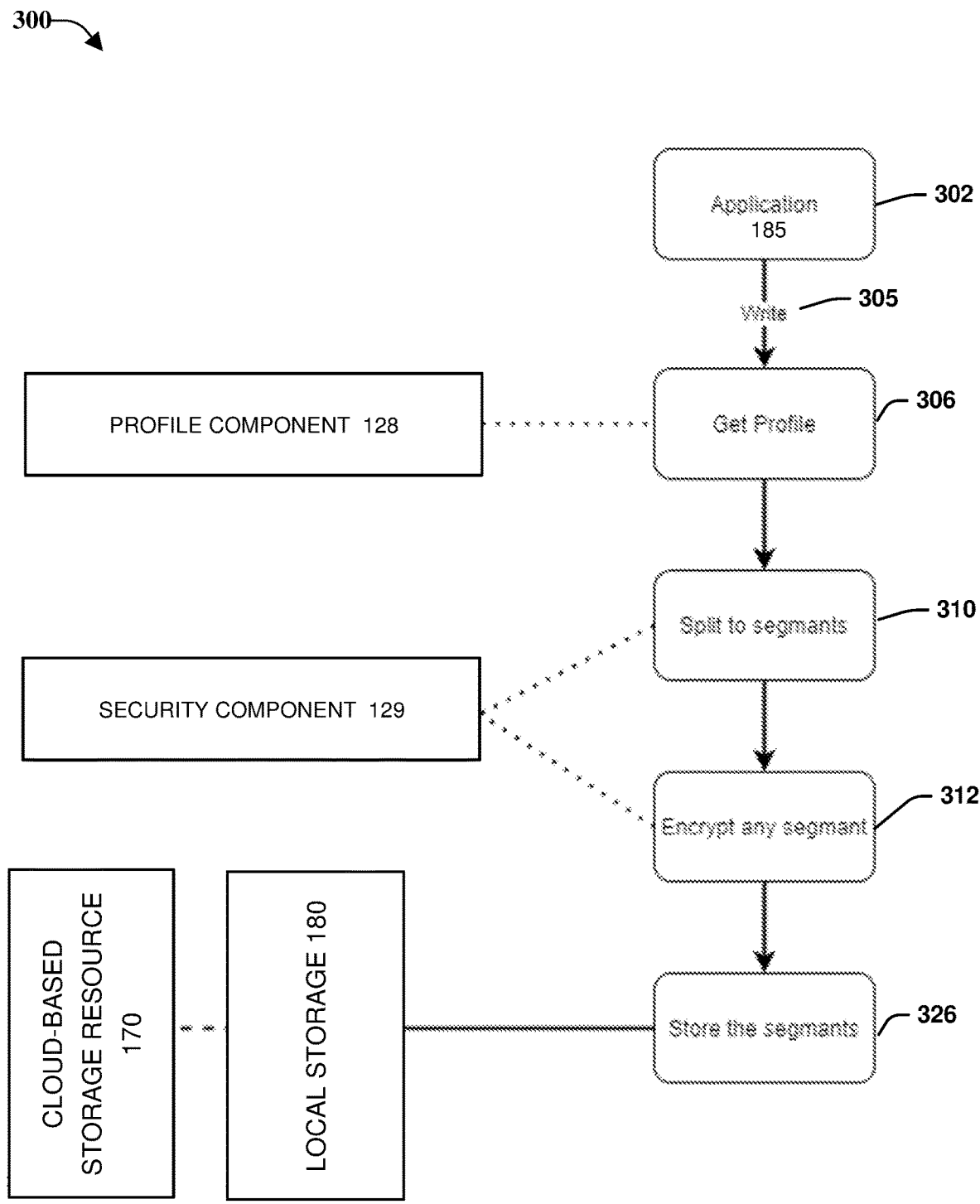
FIG. 3 is an architecture diagram of a non-limiting example system that illustrates, based on a distribution policy, dividing data between storage equipment in different security zones.

FIG. 3 is an architecture diagram of a non-limiting example system 300 that illustrates, based on a distribution policy, dividing data between storage equipment in different security zones. For purposes of brevity, description of like elements and/or processes employed in other embodiments is omitted. As depicted, system 300 includes a flow diagram of different storage processes linked to aspects of storage controller equipment 150 and the physical resources of security zones 105A-B.

At 302, application 185 can utilize request component 222 to communicate a write 305 request to storage controller equipment 150 to store data. At 306, profile component 128 can retrieve a profile with a distribution policy for storing the data. For example, executable instructions stored in memory 165 can generate profile component 128, which can retrieve distribution policy 167 from storage component 162 based on aspect of the request. In one or more embodiments, distribution policy 167 can specify different storage and retrieval characteristics for data stored in relation to one or more combinations of, the data stored by the system, application 185, data stored in each of security zones 105A-B, and other similar items.

An example storage and retrieval characteristic that can be specified by distribution policy 167 is associated with the segment size of stored segments 101A-D. An example specification is to divide the data into one half megabyte portions combined into a certain number of segments 101A-D. As discussed further below, this number of segments and segment size can relate to other distribution characteristics including, but not limited to, storage and retrieval latency, data availability, security, and replication.

In one or more embodiments, virtually addressed storage resource 255 can refer to a logically referenced amount data that appears to be a single reference, but that has data divided into segments/portions distributed across different storage resources, similar to a logical unit number (LUN) data (logical volume) with addresses for the physical resources, e.g., like small computer systems interface (SCSI) addresses. Some embodiments use this approach to promote security and other aspects for the use of logical unit numbers for storage, e.g., storing data in portions in a variety of locations (with cloud providers and local storage arrays) can reduce the likelihood that, if one storage entity is compromised, the full data of the unit number are compromised. As discussed below, other approaches that can be applied to local storage systems (e.g., parity-based recovery structures such as RAID) can also be applied across local and remote systems in different security zones 105A-B. At 310, this distribution can be affected by dividing the into segments, e.g., as specified by target storage specifications in distribution policy 167.

Another example characteristic of the storage of data by one or more embodiments is associated with the security of the data as it is communicated and stored. Security characteristics include the encryption strength for segments stored in different security zones 101A-B, e.g., with in some implementations, stronger encryption being assigned for data stored in cloud-based storage resource 170. For example, in one or more embodiments, different authentication keys can be generated by security component 129 for segments, based on factors including where these segments are to be placed among the mapped storage resources, e.g., the distribution policy can define the higher level of security for segments based on factors including, the sensitivity of the data and the resources to which the segments are matched (such as the cloud-based storage resources). Facilitating this encryption, security component 129 can provide encryption key management functions for 312, where segments can be encrypted.

In another example, by designing distribution policy 167 based on application 185 requirements, different parts of application data can be treated differently in relation to different storage specifications. For example, for an application with multiple database objects, a distribution policy 167 can be set for enhanced security to place each object in a combination of different segments in different physical storage devices, in different security zones. Such an approach can decrease the likelihood that the entire data set is compromised.

Related to the security aspects described above, one or more embodiments can also provide replication and recovery functions for the data stored across the virtually addressed storage resources described herein. For example, in one or more embodiments, the storage specification (e.g., distribution policy 167) can define a distribution of the data into parity blocks and the generation of parity data stored across the storage devices of the virtually addressed storage resource, e.g., cloud-based storage resource 170 and local storage 180. One having skill in the relevant art(s), given the description herein, appreciates that, when implemented with local storage resources, example parity-based recovery structures include RAID parity structures.

At 326, based on distribution policy 167, the respective segments 101A-D can be stored at the physical storage locations mapped by mapping component 122.

Figure 4:
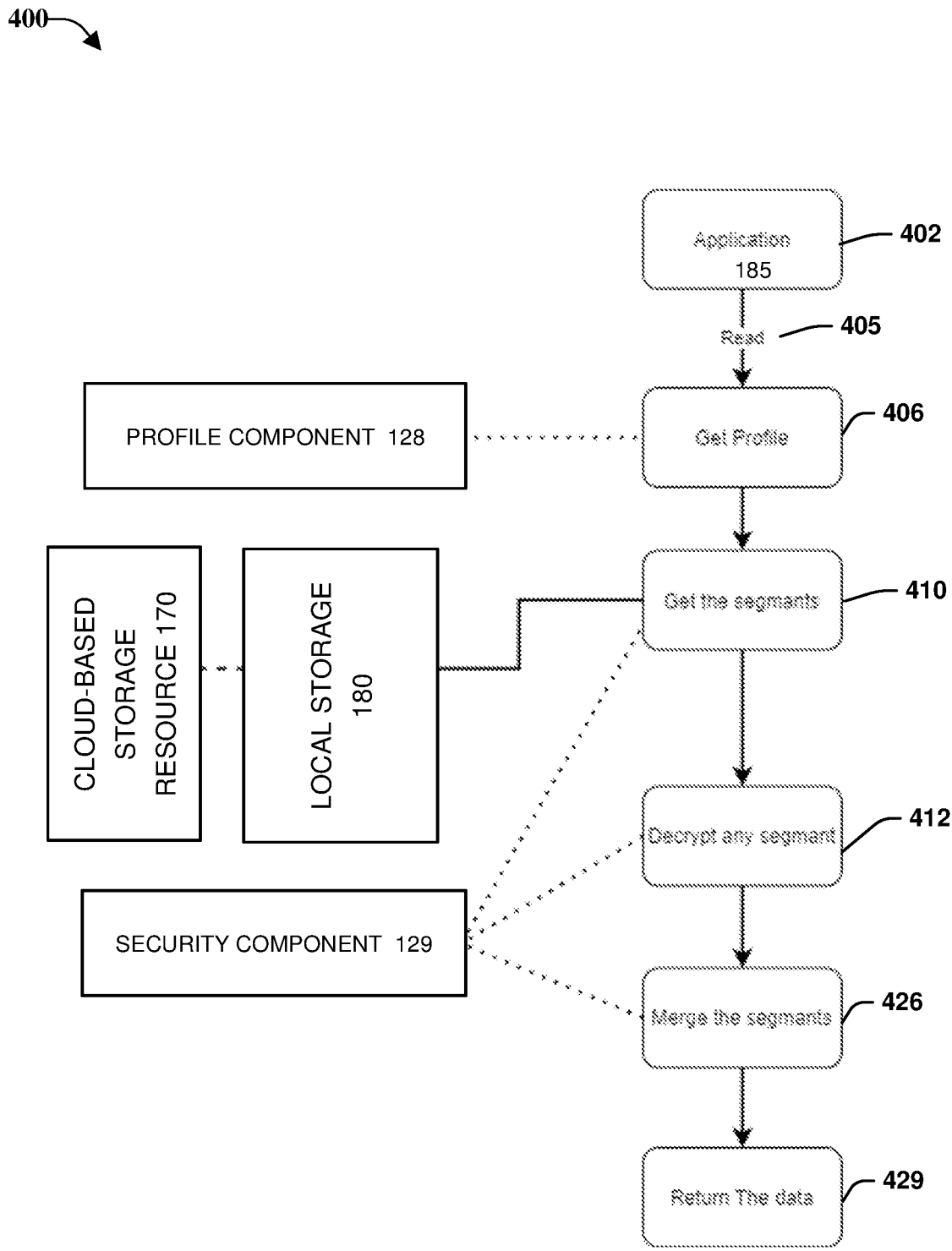
FIG. 4 is an architecture diagram of a non-limiting example system that can facilitate, based on a distribution policy, dividing data between storage equipment in different security zones.

FIG. 4 is an architecture diagram of a non-limiting example system 400 that can facilitate, based on a distribution policy, dividing data between storage equipment in different security zones. For purposes of brevity, description of like elements and/or processes employed in other embodiments is omitted. As depicted, system 400 includes a flow diagram of different retrieval processes linked to aspects of storage controller component 150 and the physical resources of security zones 105A-B.

At 402, application 185 can request data with a read 405 request, e.g., referencing virtually addressed storage resource 255. Based on the different aspects of the read request, at 406 a profile for the read operation (e.g., distribution policy 167) can be retrieved from profile component 128. Based on this profile, at 410, data segments can be retrieved from the various storage providers. Returning to the discussion of retrieval characteristics that can be specified by distribution policy 167, in some circumstances, different performance requirements (e.g., regarding latency and availability) can be specified for the data stored with reference to the virtually addressed storage resource 255. In these circumstances, distribution policy 167 can specify a combination of one or more of, the performance of the physical resources used to store the data, the communications latency for the resources (e.g., cloud-based resources can take longer to access), the encryption level to be applied to the stored data (e.g., decrypting with higher levels of security can increase latency).

With respect to data availability (e.g., recovery), one or more embodiments can split the data accordingly with reference to the recovery structure discussed above, e.g., using shards and parity to promote recovery. In an example when data is stored with two parities and one shard, this indicates that the destination locations can include three target distribution arrays, and one part of the split data can be lost without affecting recovery of the full data. Thus, in this example, application 185 can include a request for data stored on a failed storage device of the storage devices, and the data can be retrieved from the storage devices based on the parity data stored on other storage devices different from the failed storage device.

At 412, based on keys specified in the profile and provided by security component 129, the retrieved segment can be decrypted per the keys used, and at 426, the segment data can be re-assembled into one or more data files or into device data, to satisfy the request from application 185. At 429, the data can be provided to application 185 based on the request.

Figure 5:
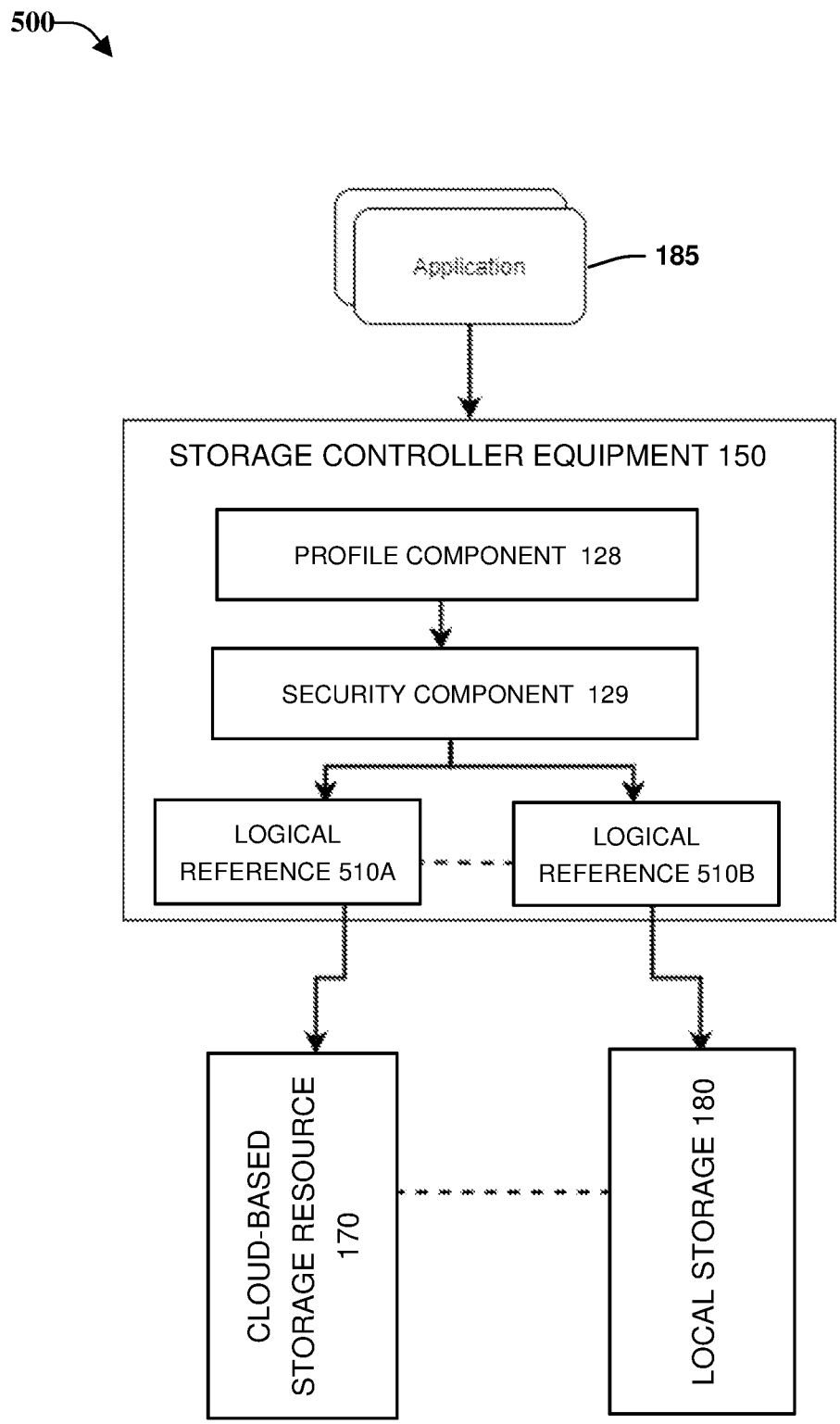
FIG. 5 depicts an example architectural diagram of a non-limiting system that can facilitate, based on a distribution policy, dividing data between storage equipment in different security zones.

FIG. 5 depicts an example architectural diagram of a non-limiting system 500 that can facilitate, based on a distribution policy, dividing data between storage equipment in different security zones. For purposes of brevity, description of like elements and/or processes employed in other embodiments is omitted. As depicted, system 400 includes another view of storage controller equipment 150 with profile component 128 and security component 129. In this example, the system references two logical references 510A-B corresponding to cloud-based storage resource 170 and local storage 180, respectively.

One or more embodiments can combine in virtual storage, disparate storage resources maintained by different storage products (e.g., hardware and software storage array products) from different entities (e.g., enterprises, firms, carriers). Benefits that can be realized by integration approaches described herein include, but are not limited to, increased availability, increased security, simultaneous use of multiple product lines maintained by different entities, with less impact for client systems, and improved overall performance. In an example implementation, a cloud-provider entity can be accessed as a client of storage controller equipment 150, thereby increasing centralized control over a variety of different physical data sources, e.g., facilitating processes including customizable storage as a service solutions.

Figure 6:
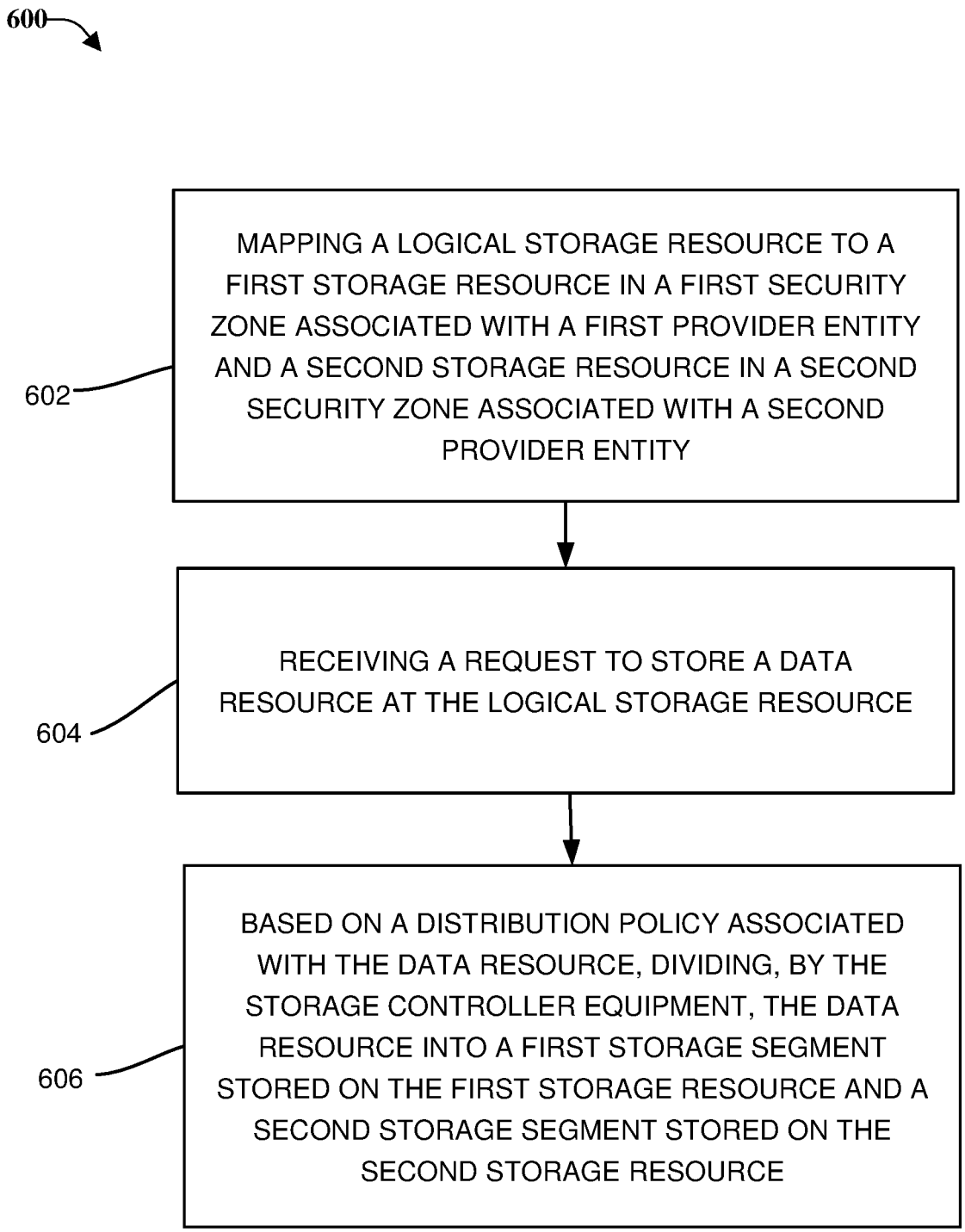
FIG. 6 depicts a flow diagram representing example operations of an example method that can facilitate, based on a distribution policy, dividing data between storage equipment in different security zones.

FIG. 6 depicts a flow diagram representing example operations of an example method 600 that can facilitate, based on a distribution policy, dividing data between storage equipment in different security zones. For purposes of brevity, description of like elements and/or processes employed in other embodiments is omitted.

In some examples, one or more embodiments of method 600 can be implemented by mapping component 122, storing component 124, segmenting component 126, and other components that can be used to implement aspects of method 600, in accordance with one or more embodiments. It is appreciated that the operating procedures of method 600 are example operating procedures, and that there can be embodiments that implement more or fewer operating procedures than are depicted, or that implement the depicted operating procedures in a different order than as depicted.

At 602 of method 600, mapping component 122 can, in one or more embodiments map a logical storage resource to a first storage resource in a first security zone associated with a first provider entity and a second storage resource in a second security zone associated with a second provider entity. At 604 of method 600, storing component 124 can, in one or more embodiments receive a request to store a data resource at the logical storage resource. At 606 of method 600, segmenting component 126 can, in one or more embodiments based on a distribution policy associated with the data resource, divide, by the storage controller equipment, the data resource into a first storage segment stored on the first storage resource and a second storage segment stored on the second storage segment stored on the second storage resource.

Figure 7:
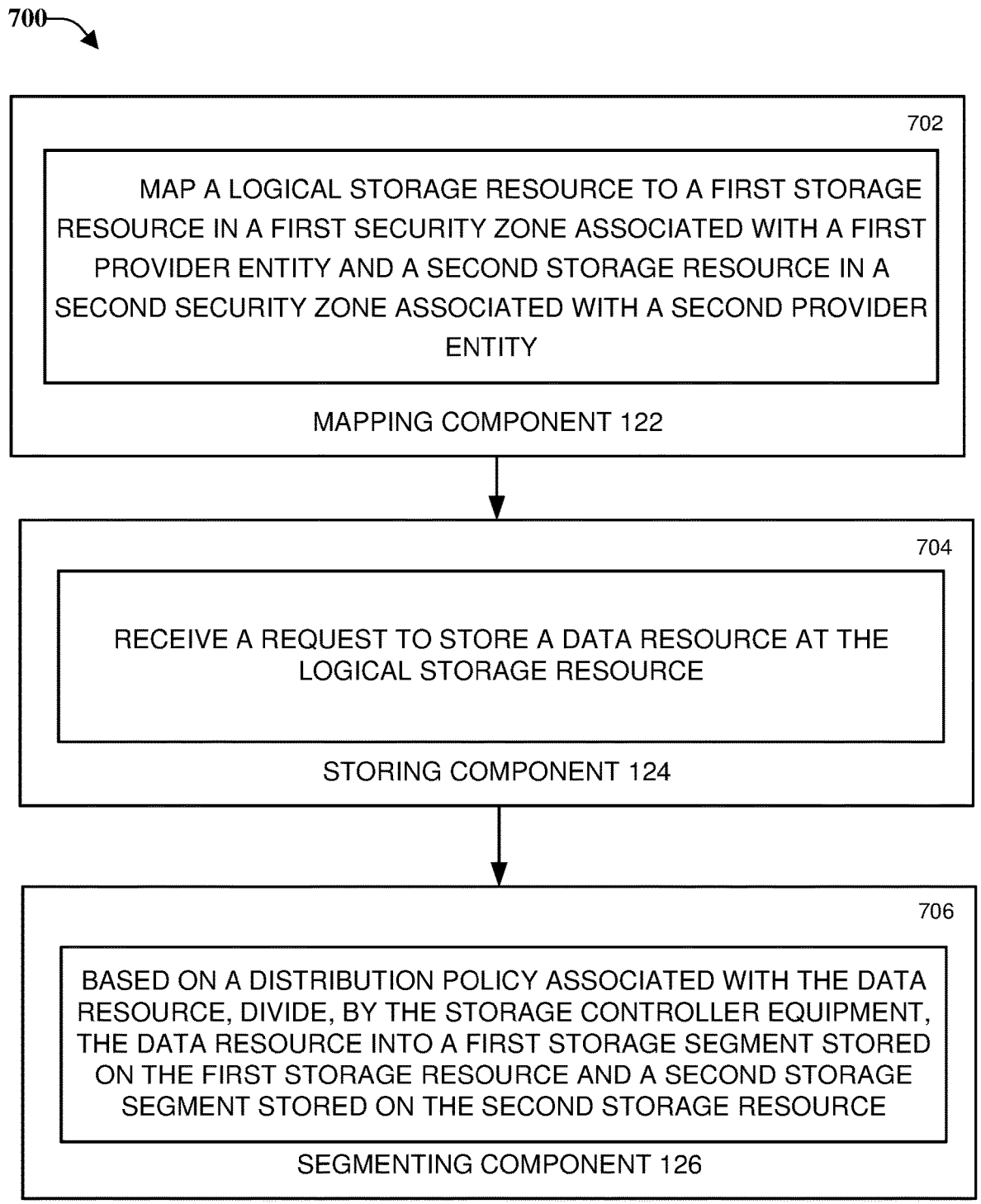
FIG. 7 depicts an example system that can facilitate, based on a distribution policy, dividing data between storage equipment in different security zones, in accordance with one or more embodiments.

FIG. 7 depicts an example system 700 that can facilitate, based on a distribution policy, dividing data between storage equipment in different security zones, in accordance with one or more embodiments. For purposes of brevity, description of like elements and/or processes employed in other embodiments is omitted. Example system 700 can include mapping component 122, storing component 124, segmenting component 126, and other components that can be used to implement aspects of system 700, as described herein, in accordance with one or more embodiments.

At 702 of FIG. 7, mapping component 122 can map a logical storage resource to a first storage resource in a first security zone associated with a first provider entity and a second storage resource in a second security zone associated with a second provider entity. At 704 of FIG. 7, storing component 124 can receive a request to store a data resource at the logical storage resource. At 706 of FIG. 7, segmenting component 126 can, based on a distribution policy associated with the data resource, divide, by the storage controller equipment, the data resource into a first storage segment stored on the first storage resource and a second storage segment stored on the second storage segment stored on the second storage resource.

Figure 8:
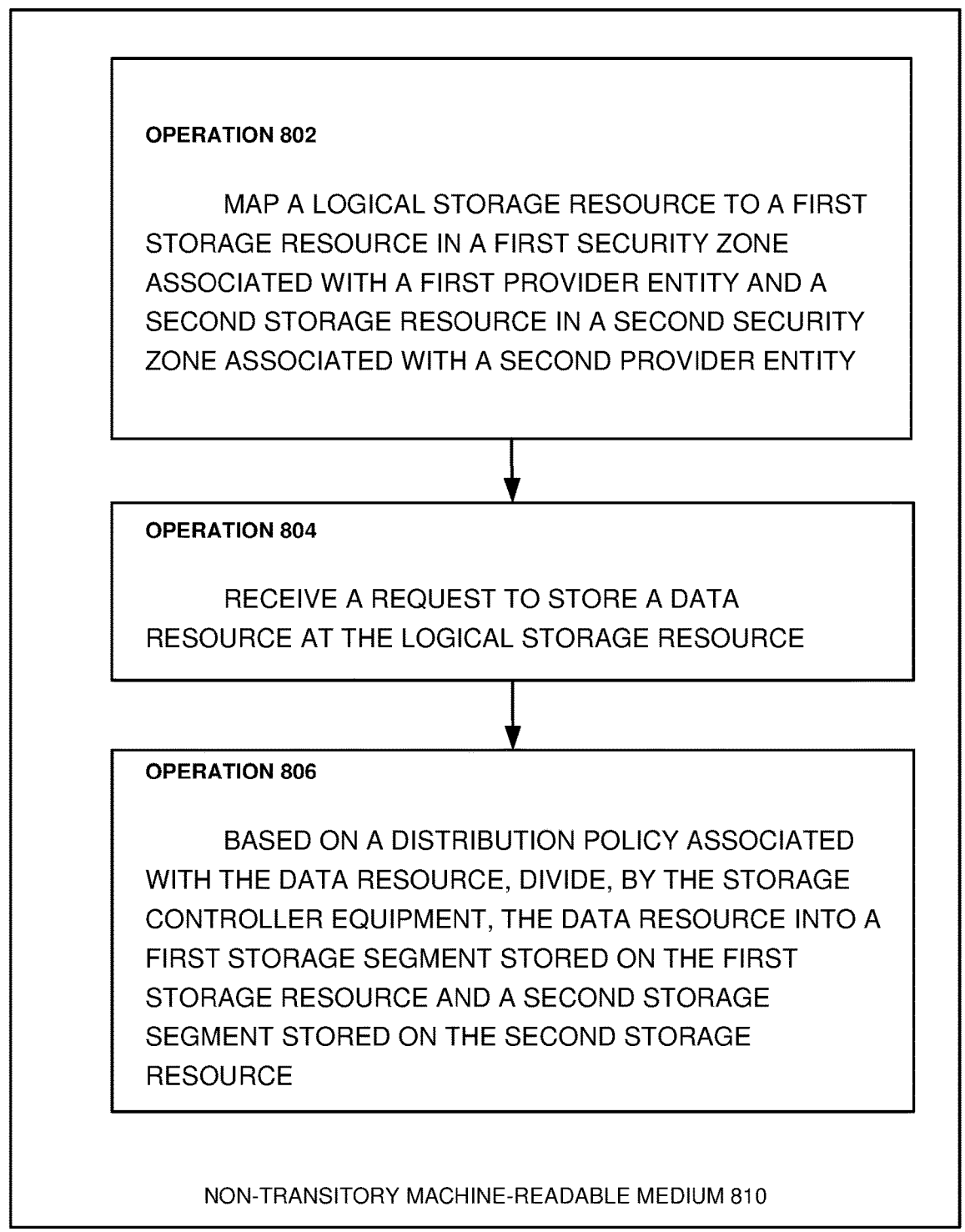
FIG. 8 depicts an example non-transitory machine-readable medium that can include executable instructions that, when executed by a processor of a system, can facilitate, based on a distribution policy, dividing data between storage equipment in different security zones.

FIG. 8 depicts an example non-transitory machine-readable medium 800 that can include executable instructions that, when executed by a processor of a system, can facilitate, based on a distribution policy, dividing data between storage equipment in different security zones. For purposes of brevity, description of like elements and/or processes employed in other embodiments is omitted.

Operation 802 of FIG. 8 can facilitate generation of mapping component 122 which, in one or more embodiments, can map a logical storage resource to a first storage resource in a first security zone associated with a first provider entity and a second storage resource in a second security zone associated with a second provider entity. Operation 804 of FIG. 8 can facilitate generation of storing component 124, which, in one or more embodiments, can receive a request to store a data resource at the logical storage resource. Operation 806 of FIG. 8 can facilitate generation of segmenting component 126 which, in one or more embodiments can, based on a distribution policy associated with the data resource, divide, by the storage controller equipment, the data resource into a first storage segment stored on the first storage resource and a second storage segment stored on the second storage segment stored on the second storage resource.

Figure 9:
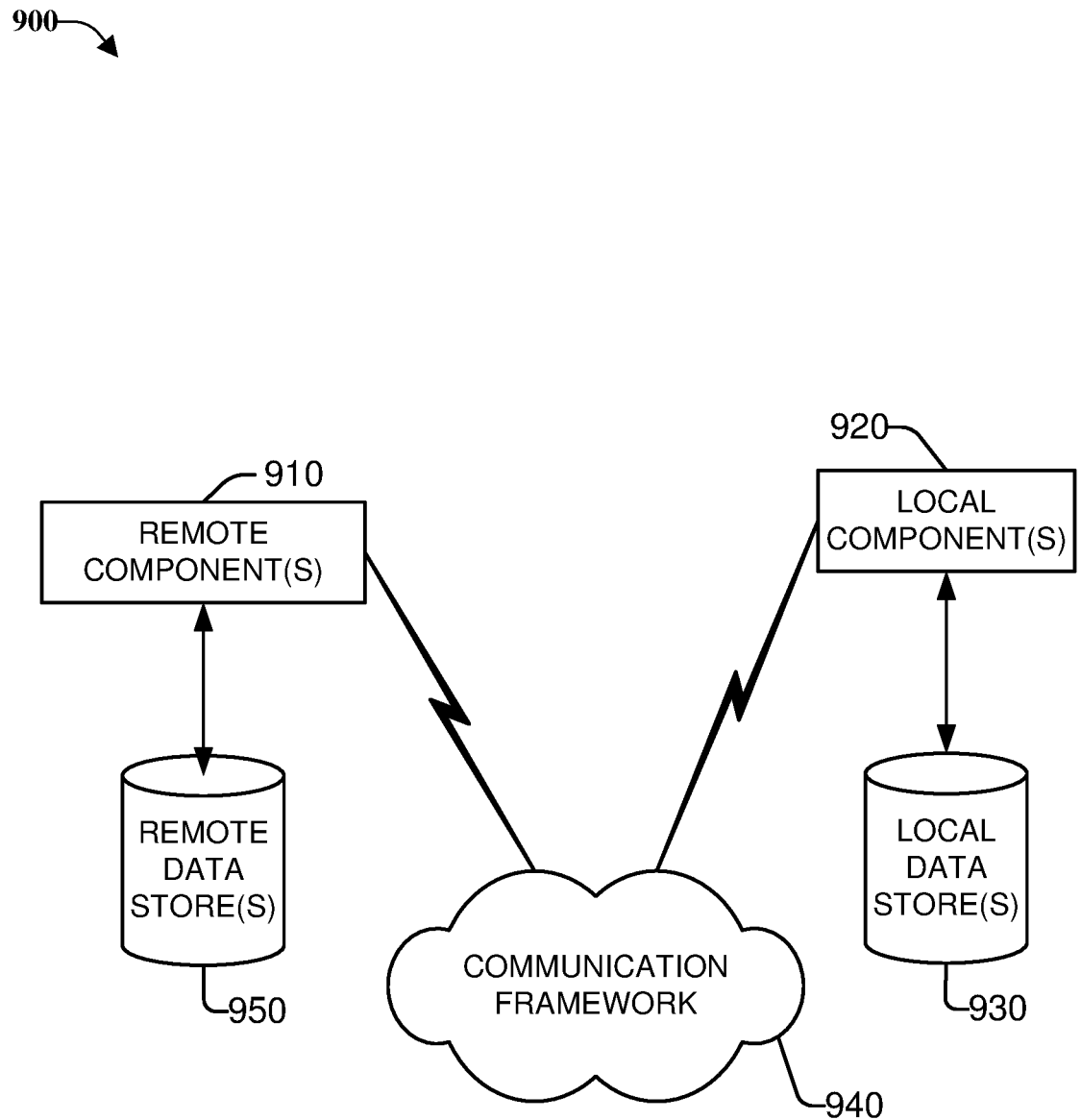
FIG. 9 depicts an example schematic block diagram of a computing environment with which the disclosed subject matter can interact.

FIG. 9 is a schematic block diagram of a system 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices).

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various aspects of the disclosed subject matter, the following discussion is intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 1020 (see below), non-volatile memory 1022 (see below), disk storage 1024 (see below), and memory storage, e.g., local data store(s) 930 and remote data store(s) 950, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
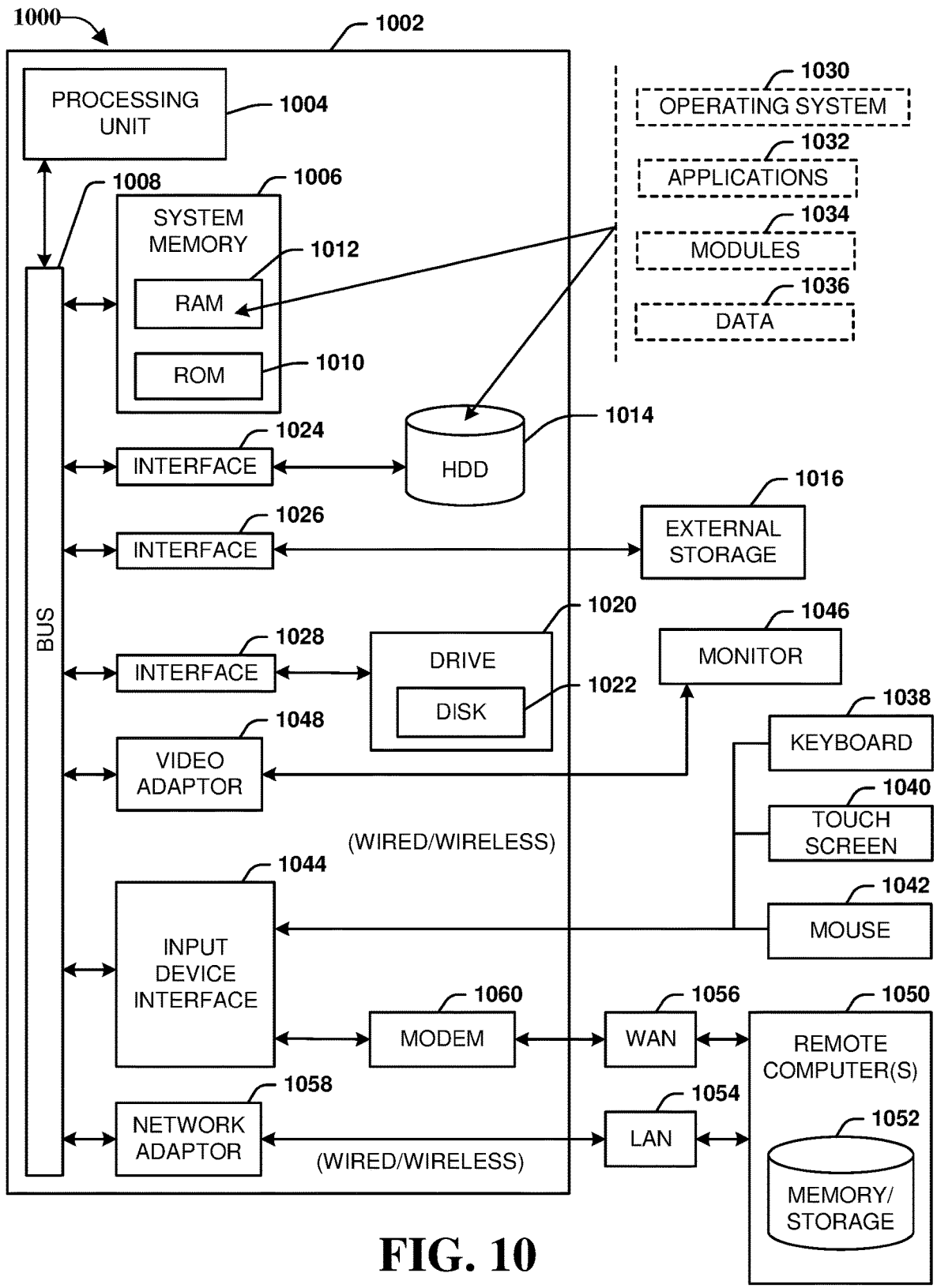
FIG. 10 illustrates an example block diagram of a computer operable to execute an embodiment of this disclosure.

Referring now to FIG. 10, in order to provide additional context for various embodiments described herein, FIG. 10 and the following discussion are intended to provide a brief, general description of a suitable computing environment 1000 in which the various embodiments described herein can be implemented.

While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include WI-FI® and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any datastream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment does not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; WI-FI®; WIMAX® protocol; Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising,
   mapping, by storage controller equipment comprising a processor, a logical storage resource to a first storage resource in a first security zone associated with a first provider entity and a second storage resource in a second security zone associated with a second provider entity;
   receiving a request to store a data resource at the logical storage resource;
   based on a distribution policy associated with the data resource, dividing, by the storage controller equipment, the data resource into a first storage segment stored on the first storage resource and a second storage segment stored on the second storage resource;
   based on a first security level applicable to a first portion of the data resource corresponding to the first storage segment, identifying a first authentication key applicable to storing the first storage segment on the first storage resource; and
   based on a second security level, different from the first security level and applicable to a second portion of the data resource corresponding to the second storage segment, identifying a second authentication key different from the first authentication key, applicable to storing the second storage segment on the second storage resource, wherein the first portion of the data resource was determined to require a higher level of security than the second portion of the data resource, and wherein, based on the higher level of security, the first authentication key provides a higher level of security than the second authentication key.

2. The method of claim 1, wherein the first storage resource comprises a storage array.

3. The method of claim 1, wherein the logical storage resource is identified by a logical unit number and mounted as a volume within an operating system.

4. The method of claim 1, wherein the second storage resource comprises a cloud-based storage resource, and wherein the second provider entity comprises a cloud-based storage provider entity.

5. The method of claim 1, wherein the first storage segment is stored on the first storage resource by employing the first authentication key and the second storage segment is stored on the second storage resource by employing the second authentication key.

6. The method of claim 1, wherein the distribution policy defines a division of the data resource into storage segments respectively stored across storage resources comprising the first storage resource, the second storage resource, and additional storage resources in accordance with a parity recovery data structure, and wherein the parity recovery data structure employs parity information stored at ones of the storage resources to facilitate recovery of a data segment stored at a failed storage resource of the storage resources.

7. The method of claim 6, wherein the parity information comprises distributed parity information stored across ones of the storage resources.

8. The method of claim 1, wherein the distribution policy defines a first size of the first storage segment.

9. The method of claim 8, wherein the distribution policy further defines a second size of the second storage segment different from the first size.

10. The method of claim 1, wherein the distribution policy specifies distribution of the second storage segment in accordance with an availability threshold of availability associated with data of the second storage segment and an availability characteristic of the second storage resource.

11. The method of claim 1, further comprising:
    analyzing the first portion of the data resource, resulting in a sensitivity level of the first portion of the data resource, wherein the first security level applicable to the first portion of the data resource was selected based on the sensitivity level.

12. A device, comprising:
    a memory that stores computer executable components; and
    a processor that executes the computer executable components stored in the memory, wherein the computer executable components comprise:
        a request component that communicates a retrieval request to a storage controller device to retrieve data from a virtually addressed storage resource, and
        an indicator component that receives, from the storage controller device, an indication that the data was retrieved from the virtually addressed storage resource, wherein the data was stored by dividing the data into parts stored at storage devices mapped to the virtually addressed storage resource in accordance with a storage specification, and wherein the storage devices comprise a first storage device managed by a provider entity associated with operation of the storage controller device and a second storage device managed by a different provider entity, wherein the data was retrieved from the virtually addressed storage resource based on a first authentication key used to store a first part of the data at the first storage device and a second authentication key used to store a second part of the data at the second storage device, wherein the first storage device is managed by the provider entity in accordance with a first zone of security, wherein the different provider entity comprises a cloud-based storage entity managing the second storage device in a second zone of security lower than the first zone of security, and wherein the first part of the data was stored at a higher zone of security than the second part based on the first part of the data being characterized as more sensitive data than the second part of the data.

13. The device of claim 12, wherein the data comprises a third part of the data with a first latency requirement and fourth part of the data with a second latency requirement, wherein the first storage device comprises a first latency characteristic and the second storage device comprises a second latency characteristic specifying higher latency than the first latency characteristic as a result of a determination that the second storage device comprises a cloud-based storage device external to the device and the first storage device comprises a storage device local to the device, and wherein the first part of the data was specified to be stored on the first storage device based on the first latency requirement and the first latency characteristic.

14. The device of claim 12, wherein the storage specification defined a division of the data into parity blocks and the generation of parity data stored across the storage devices of the virtually addressed storage resource, wherein the retrieval request comprises a retrieval request for data stored on a failed storage device of the storage devices, and wherein the data was retrieved from the storage devices based on the parity data stored on other storage devices different from the failed storage device.

15. The device of claim 12, wherein the first part of the data was characterized as more sensitive data than the second part of the data based on an analysis of the first part of the data and the second part of the data.

16. The device of claim 15, wherein the first part of the data was stored at the first storage device based on the analysis of the first part of the data.

17. A non-transitory machine-readable medium comprising executable instructions that, when executed by a processor of a controller device, facilitate performance of operations, the operations comprising:

mapping a logical storage unit identifier to storage resources comprising a local storage resource in a local security zone associated with a first provider entity and a cloud-based storage resource in a cloud security zone associated with a second provider entity;

receiving a request to store a data object by employing resources corresponding to the logical storage unit identifier;

based on the request, segmenting the data object into a first segment stored at the local storage resource with a first security level based on the local security zone and a second segment stored at the cloud-based storage resource with a second security level based on the cloud security zone, resulting in a segmented data object;

based on a first sensitivity level applicable to a first content part of the data object corresponding to the first segment, identifying a first authentication key applicable to storing the first segment on the local storage resource; and based on a second sensitivity level, different from the first sensitivity level and applicable to a second content part of the data object corresponding to the second segment, identifying a second authentication key different from the first authentication key, applicable to storing the second segment at the cloud-based storage resource, wherein the first content part was determined to have a higher level of sensitivity than the second content part, and wherein, based on the higher level of sensitivity, the first authentication key provides a higher level of security than the second authentication key.

18. The non-transitory machine-readable medium of claim 17, wherein the operations further comprise:
generating parity data for the segmented data object; and
distributing the parity data across the resources corresponding to the logical storage unit identifier.

19. The non-transitory machine-readable medium of claim 17, wherein the local storage resource comprises a local storage array managed by the controller device.

20. The non-transitory machine-readable medium of claim 17, wherein the first sensitivity level applicable to a first content part of the data object was identified based on an analysis of the first portion of the first content part of the data object.

* * * * *